Figure 1:
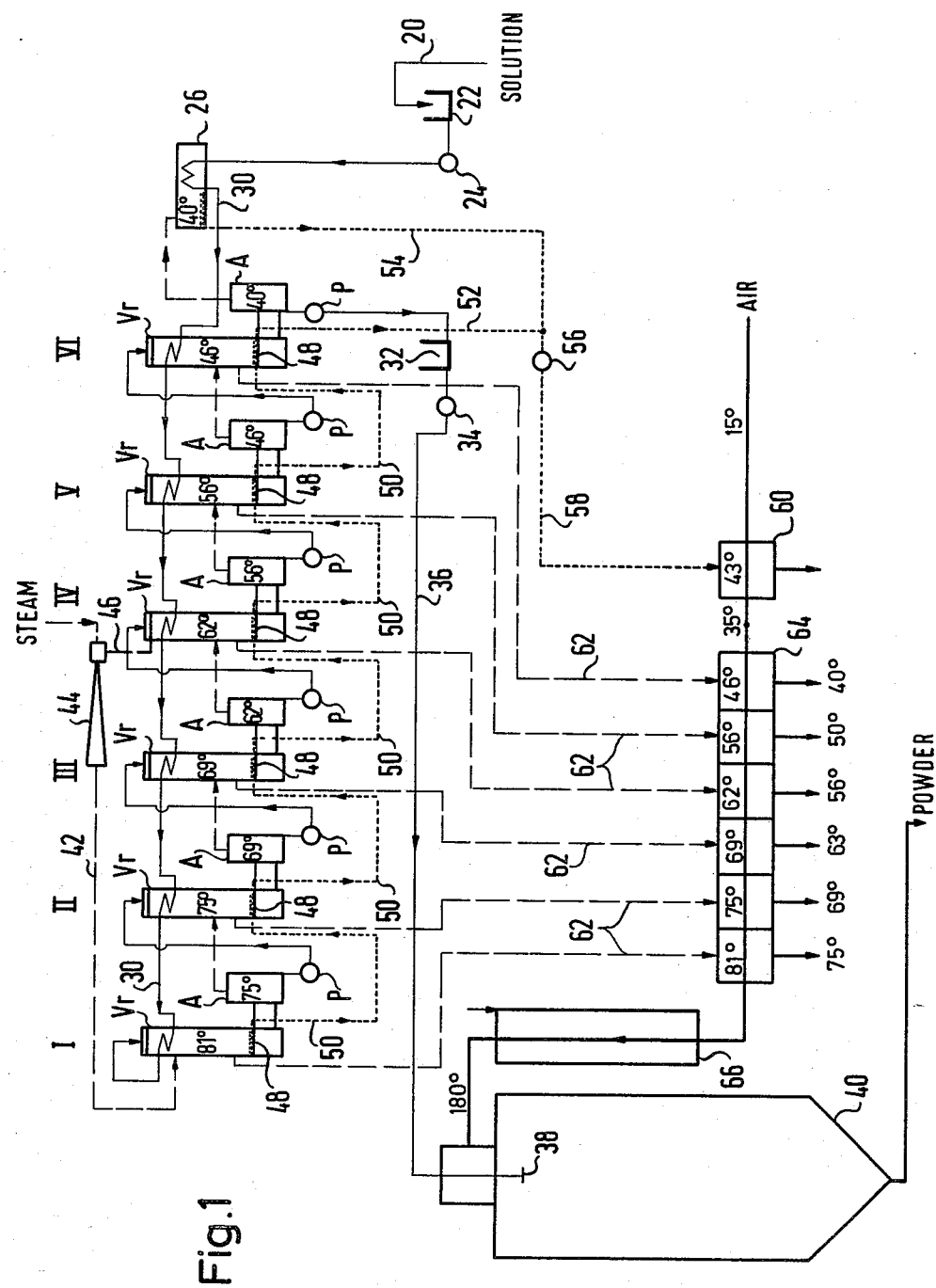

United States Patent [19]

Engelhardt

[11] 4,239,588

[45] Dec. 16, 1980

[54] METHOD OF EFFECTIVELY UTILIZING THERMAL ENERGY IN SPRAY DRYING

[75] Inventor: Joachim Engelhardt, Marxzell-Burbach, Fed. Rep. of Germany

[73] Assignee: Wiegand Karlsruhe GmbH, Ettlingen, Fed. Rep. of Germany

[21] Appl. No.: 24,253

[22] Filed: Mar. 27, 1979

Related U.S. Application Data

[63] Continuation of Ser. No. 843,273, Oct. 18, 1977, abandoned.

[30] Foreign Application Priority Data

Oct. 25, 1976 [DE] Fed. Rep. of Germany ....... 2648219

[51] Int. Cl.³ .......................... B01D 1/18; B01D 1/26
[52] U.S. Cl. .................... 159/48 R; 159/4 K; 159/4 VM; 159/17 R; 159/24 B; 202/174
[58] Field of Search ........... 202/173, 174; 159/4 MS, 159/4 K, 4 VM, 17 P, 17 R, 17 VS, 24 B, 48

[56] References Cited

U.S. PATENT DOCUMENTS

| | | | |
|---|---|---|---|
| 2,489,654 | 1/1970 | Geiringer | 202/174 |
| 3,185,580 | 5/1965 | Hanrahan et al. | 159/4 VM |
| 3,261,766 | 7/1966 | Sherwood | 202/174 |
| 3,392,089 | 7/1968 | Gupthill, Jr. et al. | 202/174 |
| 3,428,107 | 2/1969 | Backteman | 202/174 |
| 3,862,909 | 1/1975 | Copeland | 159/4 VM |
| 3,968,002 | 7/1976 | Standiford | 159/17 R |

*Primary Examiner*—Norman Yudkoff
*Attorney, Agent, or Firm*—Toren, McGeady and Stanger

[57] ABSTRACT

The thermal energy required for spray drying a solution of a solid product in a volatile, liquid solvent is effectively utilized by partly converting the solvent to a gaseous phase in a multiple-effect evaporator and by spray drying the resulting concentrate by means of a gaseous fluid at least partly preheated by heat exchange with solvent vapor or condensate from at least two effects in respective stages of a multiple-stage heating arrangement.

5 Claims, 5 Drawing Figures

METHOD OF EFFECTIVELY UTILIZING THERMAL ENERGY IN SPRAY DRYING

This is a continuation of application Ser. No. 843,273 filed Oct. 18, 1977, now abandoned.

This invention relates to a method of effectively utilizing thermal energy supplied to a solution of a solid product in a volatile solvent, and in its more specific aspects to the operation of a multiple-effect evaporator in conjunction with a multiple-stage heating arrangement.

While not limited to such an application, the invention will be described hereinbelow primarily in its application to the partial evaporation of volatile, liquid solvent from the solution of a solid product in the solvent in a multiple-effect evaporator and to the spray drying of the resulting concentrate by means of a gaseous fluid preheated at least in part by means of thermal energy derived from the evaporator.

It was common practice heretofore to heat the gas required for operation of a spray dryer from ambient temperature in a single, steam-heated exchanger to the drying temperature, typically from 15° C. to 180° C. It has also been proposed to withdraw condensate from the last effect of the evaporator and to preheat the gas from 15° to typically 35° C. by heat exchange with the condensate prior to heat exchange with live steam. The temperature differences between the gas and the carrier of thermal energy in the known procedure are high over a major portion of each heat exchange zone, resulting in substantial entropy gaps which unfavorably affect the cost of heating the gas.

It is a primary object of this invention to utilize thermal energy in spray drying and analogous processes more effectively than was possible heretofore.

With this object and others in view, the invention, in one of its aspects resides in a method in which a solution of a solid product in a volatile solvent is heated in a multipe effect evaporator by sequential heat exchange of the solution with a condensible gas at a different temperature and a different pressure in each effect so as to convert the gas to a liquid phase, and to convert a portion of the solvent to a gaseous phase, whereby ultimately a concentrate is formed from the solution. A portion of one of the two phases is withdrawn from at least two effects. A fluid is passed sequentially through at least two stages of a heating arrangement having a plurality of stages, and the fluid is heated in the two stages by heat exchange with the phases respectively withdrawn from the two effects.

Figure 2:
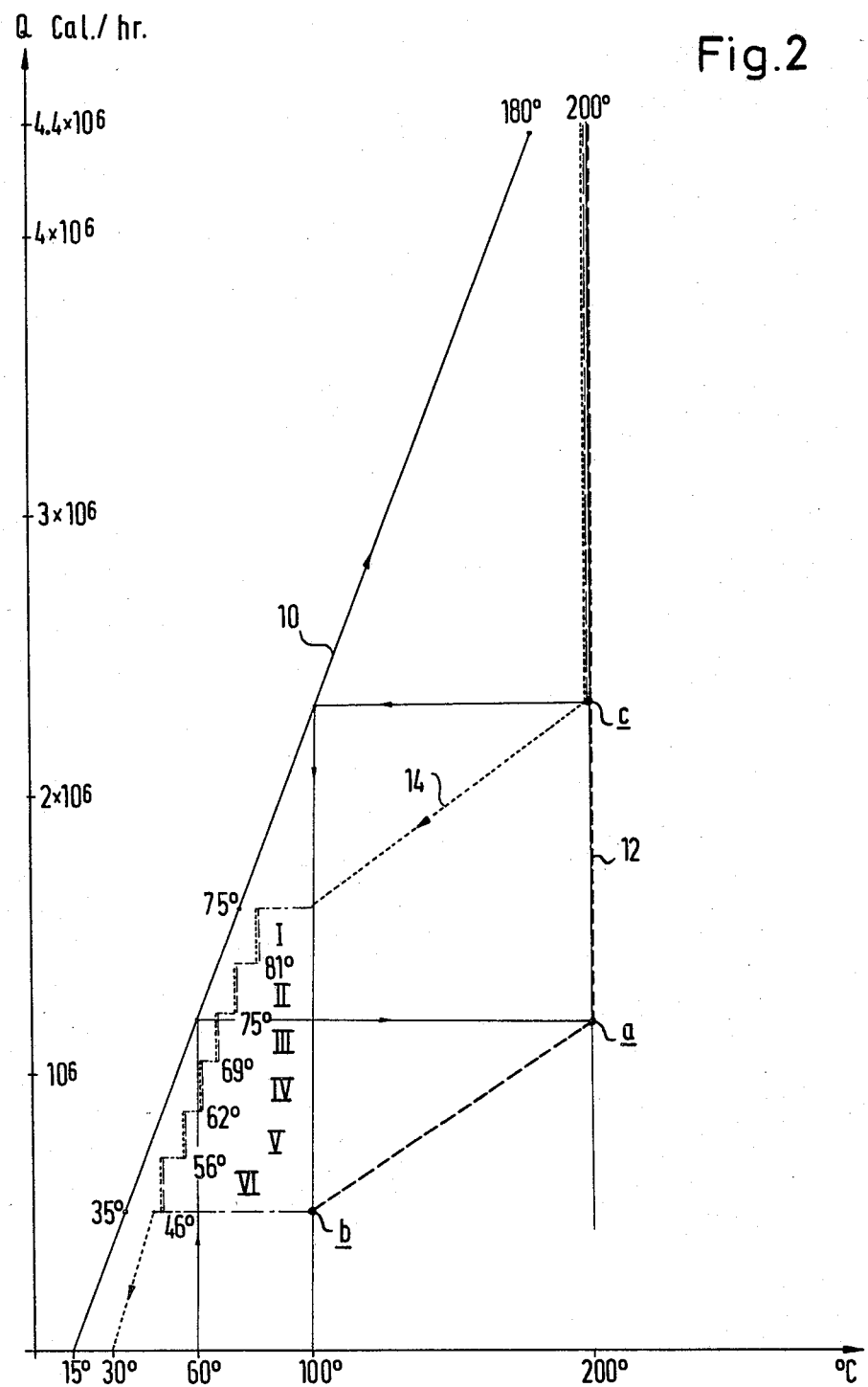
Figure 3:
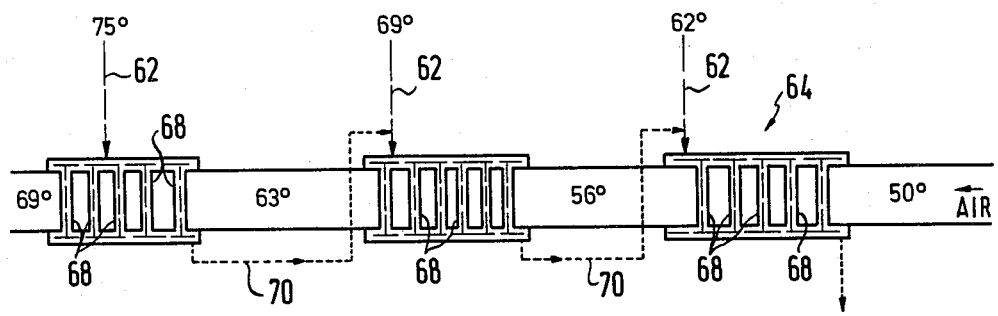
Figure 4:
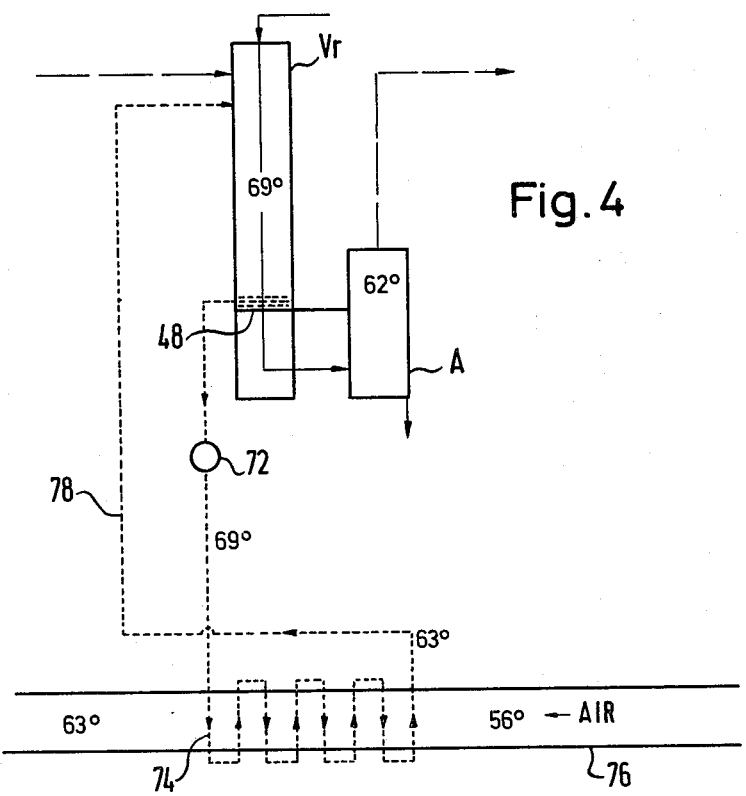
Figure 5:
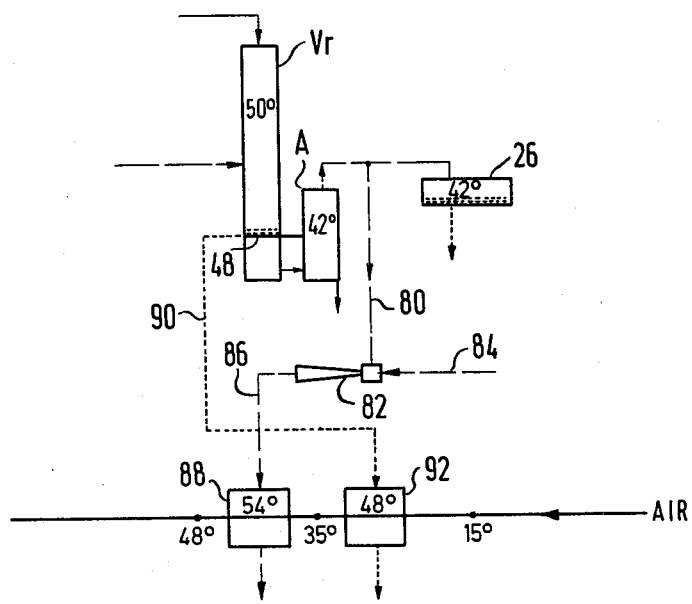

Other features, additional objects, and many of the attendant advantages of this invention will readily be appreciated from the following detailed description of preferred embodiments when considered in connection with the appended drawing in which:

FIG. 1 is a flow sheet of a spray drying installation according to the invention;

FIG. 2 diagrammatically illustrates the operation of a portion of the apparatus of FIG. 1;

FIG. 3 shows a modified portion of the apparatus of FIG. 1 on a larger scale; and FIGS. 4 and 5 illustrate further modifications of the arrangement of FIG. 1 in fragmentary conventional representation.

All temperatures indicated in the drawing and referred to hereinbelow are in degrees Celsius.

Referring now to the drawing in detail, and initially to FIG. 1, there is shown a spray drying installation in which the air needed for the spray drying is pre-heated in a heat exchange system according to the invention.

The solution to be evaporated to dryness is fed cold through a line 20 to a storage tank 22 from which it is conveyed by a pump 24 through a heat exchanger 26. The solution is preheated by condensation of vapor from the last or sixth effect VI of a multiple-effect evaporator, thereby generating the necessary vacuum in the evaporator. The preheated liquid feed, flowing through a line 30, is heated to successively higher temperatures by passage through the evaporator unit Vr in each of the six effects VI to I, and is finally fed to an evaporation surface in the evaporator unit Vr of the first effect I, in this instance, the interior of long vertical tubes, conventional, and not specifically illustrated. A separator A associated with the first evaporator unit Vr releases the vapor generated from the volatile liquid in solution to the heating element of the evaporator unit in the second effect II. The residual solution is transferred from the separator A by a pump P to the tubes of the second effect. The same procedure is repeated in effects II, III, IV, V, VI from which the concentrate formed from the solution is discharged to a tank 32. It is transferred from the tank by a pump 34 and a line 36 to the nozzle 38 of a spray dryer 40, conventional in itself and not shown in detail. The vapor separated from the concentrate in the separator A of the last stage is condensed in the afore-mentioned heat exchanger 26.

Live steam at 200° C. and 15 bars is supplied from a non-illustrated steam generator to a steam jet thermocompressor 44 in which it mixes with and compresses vapor tapped from effect IV through a line 46 at 62° C. and 218 millibars. A line 42 conveys the resulting mixture as a heating fluid to the heating element of effect I for heat exchange with the preheated solution. The condensate formed is collected on the bottom 48 of the evaporator unit Vr in the first effect and conveyed to the bottom 48 in the evaporator Vr of the next effect II through a line 50 equipped with a pump, not shown, and all evaporator condensates ultimately are withdrawn from the bottom 48 of effect VI through a line 52 which is joined by a condensate line 54 from the heat exchanger 26. A pump 56 forwards the combined condensates through a line 58 to the first stage 60 of an eight-stage heat exchanger array for preheating the air needed in the dryer 40 from its original temperature of 15°. Air leaving the heat exchanger stage 60 at 35° is sequentially led through a six-stage heat exchanger unit 64 for sequential heat exchange with solvent vapor withdrawn from the six evaporators through respective lines 62. The air leaving the last stage of the heat exchanger unit 64 is further heated with steam from the afore-mentioned generator in a conventional heat exchanger 66 to a temperature of 180° before being fed to the dryer 40, there to furnish the heat of evaporation for the remainder of the liquid solvent in the concentrate pumped from effect VI, and the kinetic energy for pulverizing the solid residue which is recovered.

As is indicated in FIG. 1, the vapor temperatures in the evaporator units Vr of the six effects are, in sequence, 81°, 75°, 69°, 62°, 56°, and 46°, and the vapor is partly supplied at the same temperature to an associated stage of the heat exchanger unit 64 to be condensed there, the six concentrate being released at 75°, 69°, 63°, 56°, 50°, and 40° respectively from the six effects. The vapor temperatures in the several separators A are the same as those in the following evaporator units.

The flow of thermal energy in the apparatus of FIG. 1 is illustrated in FIG. 2 in a chart correlating temperature in °C. and heat flow Q in Cal./hr. The increase in the temperature of the air with increasing heat content is represented by a straight line 10. Steam entering the system shown in FIG. 1 at 200° C. loses energy as indicated by the dotted line 14.

Condensation of the heating steam is complete at a temperature of the heated air of 100° C. in this embodiment (point c). It is undercooled from the initial 200° to this temperature of 100° C. The air is heated at lower temperatures by condensation of vapors from the six evaporator effects I to VI. The saturation temperature of the vapors withdrawn from the several effects is close to the temperature of the air to be heated. The distance of the straight line 10 from the corresponding sections of the line 14 is indicative of a thermal efficiency much better than that achieved in an otherwise comparable, conventional air preheating arrangement whose steam temperature is represented by the line 12 in relationship to the same straight line 10 representing air temperature. In the conventional, single-stage system, steam supplied at 200° C. is fully condensed at a temperature of the heated air of 60° C. (point a in FIG. 1), and is then returned to the boiler or other steam generator as water of 100° C. (point b in FIG. 1). The spacing between the lines 10 and 12 is indicative of the great entropy gaps and the corresponding relatively unfavorable thermal efficiency.

In the modified apparatus of FIG. 3, vapor withdrawn from the several evaporator effects I to VI is fed by the lines 62 to respective heat exchanger sections 68 where it is condensed by heat exchange with the air supplied to the spray drier, and the condensate is led countercurrent to the air stream to the next heat exchanger section 68 by a connecting line 70.

In the further modified arrangement partly illustrated in FIG. 4 by reference to effect III, the associated heat exchanger section 74 is supplied with thermal energy by means of the liquid phase or condensate from the bottom 48 in the evaporator unit Vr. The condensate is circulated by a pump 72 through a pipe 74 of the heat exchanger section coiled about the pipe 76 carrying the air. The condensate entering this heat exchange arrangement at 69° is returned to the heating element in the evaporator unit Vr through a line 78 at 63° while the air temperature is raised from 56° to 63° C. Each effect of the apparatus shown in FIG. 1 may be modified in the same manner.

The arrangement shown in FIG. 4 permits the amount of condensate circulated per unit time to be chosen independently of the amount of condensate formed in the associated effect, and the amount of thermal energy withdrawn from the evaporator unit in this manner may be chosen at will. It is necessary to store enough condensate in the evaporator effect to keep the pipes of the circulation system filled with liquid.

FIG. 5 illustrates a modification of a part of the apparatus of FIG. 1. In this specific embodiment, a part of the vapor is withdrawn as a gaseous phase through a line 80 from a separator A of the last effect VI at a rate of 300 kg/hr. at 42° corresponding to a pressure of 82 millibars. The withdrawn vapor is fed to a steam jet thermocompressor 82 which is supplied with 300 kg/hr. heating steam at 200° and 16 bars through a line 84. The compressor furnishes 600 kg/hr. steam at 54° C. at a pressure of 150 millibars through a line 86 to a stage 88 of a heat exchanger for the air supply of the spray dryer, not itself shown in FIG. 5. The steam condensate is released as indicated by an arrow.

Condensate from the bottom 48 of the evaporator unit Vr of the effect VI preceding the afore-mentioned separator A is supplied to the first stage 92 of the air heating system which feeds air at 35° to the stage 88.

The temperature and pressure relationships specifically described and partly indicated in the drawing are based on the evaporation of an aqueous solution of milk solids which is ultimately recovered as a powder, and the vapors referred to above are water vapor. Other temperatures and pressures will establish themselves in the same apparatus if operated with volatile solvents other than water. Air is merely illustrative of the gaseous and liquid fluids which may be heated by heat exchange with a gaseous or a liquid phase, vapor or condensate, withdrawn from the several effects of the multiple effect evaporator in the manner described above.

While the invention has been described in its presently preferred application to the recovery of a pulverulent solid product from its solution in a volatile solvent, thermal energy may be derived from a multiple-effect evaporator according to this invention for heating a fluid not ultimately intended for contact with the concentrate produced in the evaporator. Hot air or another hot gas may be heated in the manner described for subsequent use in a pneumatic dryer for solids not derived from the associated evaporator.

An evaporator having six effects has been described in its cooperation with six stages of a multiple-stage heating arrangement. However, the advantages of this invention are at least partly available with a multiple-effect evaporator having only two effects, and with a heating arrangement having only two stages.

It should be understood, therefore, that the foregoing disclosure relates only to presently preferred embodiments of the invention, and that it is intended to cover all changes and variations of the examples of the invention herein chosen for the purpose of the disclosure which do not constitute departures from the spirit and scope of the invention set forth in the appended claims.

What is claimed is:

1. A method of effectively utilizing thermal energy supplied to a solution of a solid product in a volatile solvent which comprises:

(a) heating said solution in a multiple-effect evaporator by sequential heat exchange of said solution with a condensible gas in respective effects at different temperatures and pressures to convert said gas to a liquid phase, and to convert a portion of said solvent to a gaseous phase in each effect until a liquid concentrate is formed from said solution;

(b) separately withdrawing respective portions of one of said phases from each of at least two of said effects;

(c) passing a gaseous fluid sequentially through at least two stages of a heating arrangement having a plurality of stages;

(d) heating said gaseous fluid in said at least two stages by heat exchange with the portions of the phases respectively withdrawn from said at least two effects;

(e) contacting said concentrate with an amount of the heated gaseous fluid sufficient to evaporate the remaining solvent from said concentrate;

and wherein said withdrawn one phase is said liquid phase and is returned to one of said effects after heat exchange with said gaseous fluid in one of said two stages.

2. A method of effectively utilizing thermal energy supplied to a solution of a solid product in a volatile solvent which comprises:
   (a) heating said solution in a multiple-effect evaporator by sequential heat exchange of said solution with a condensible gas in respective effects at different temperatures and pressures to convert said gas to a liquid phase, and to convert a portion of said solvent to a gaseous phase in each effect until a liquid concentrate is formed from said solution;
   (b) separately withdrawing respective portions of one of said phases from each of at least two of said effects;
   (c) passing a gaseous fluid sequentially through at least two stages of a heating arrangement having a plurality of stages;
   (d) heating said gaseous fluid in at least three stages by heat exchange with the portions of the phases respectively withdrawn from said at least two effects;
   (e) contacting said concentrate with an amount of the heated gaseous fluid sufficient to evaporate the remaining solvent from said concentrate;
and wherein the temperature of said gaseous fluid in the third stage is lower than in said two stages, said one phase being said gaseous phase and being condensed by heat exchange with said gaseous fluid in one of said two stages, the resulting condensate being fed to said third stage for heat exchange therein with said gaseous fluid.

3. A method of effectively utilizing thermal energy supplied to a solution of a solid product in a volatile solvent which comprises:
   (a) heating said solution in a multiple-effect evaporator by sequential heat exchange of said solution with a condensible gas in respective effects at different temperatures and pressures to convert said gas to a liquid phase, and to convert a portion of said solvent to a gaseous phase in each effect until a liquid concentrate is formed from said solution;
   (b) separately withdrawing respective portions of one of said phases from each of at least two of said effects;
   (c) passing a gaseous fluid sequentially through at least two stages of a heating arrangement having a plurality of stages;
   (d) heating said gaseous fluid in said at least two stages by heat exchange with the portions of the phases respectively withdrawn from said at least two effects;
   (e) contacting said concentrate with an amount of the heated gaseous fluid sufficient to evaporate the remaining solvent from said concentrate;
and wherein respective portions of said solvent are converted to the gaseous phase in one of said effects at a higher temperature than in another effect, said gaseous phase is partly withdrawn from said other effect and mixed with live steam in an amount sufficient to raise the temperature of the resulting mixture above said higher temperature and feeding said mixture to said one effect for heat exchange with said solution in said one effect and said mixture is produced by steam jet thermocompression of said gaseous phase by means of said live steam.

4. A method as set forth in claim 1, wherein said one phase withdrawn from one of said effects is said converted portion of said solvent, said converted portion being mixed with live steam of higher temperature and pressure, and the mixture so produced being fed to one of said stages for heat exchange with said fluid.

5. A method as set forth in claim 4, wherein said mixture is produced by steam jet thermocompression of said converted portion by means of said live steam.

* * * * *